(12) United States Patent
Pascall

(10) Patent No.: US 10,733,906 B2
(45) Date of Patent: Aug. 4, 2020

(54) TEXTURE-INDUCIBLE SUBSTRATE

(71) Applicant: Lawrence Livermore National Security, LLC, Livermore, CA (US)

(72) Inventor: Andrew J. Pascall, Livermore, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 89 days.

(21) Appl. No.: 15/015,080

(22) Filed: Feb. 3, 2016

(65) Prior Publication Data

US 2016/0225505 A1 Aug. 4, 2016

Related U.S. Application Data

(60) Provisional application No. 62/111,565, filed on Feb. 3, 2015.

(51) Int. Cl.
*H04B 3/36* (2006.01)
*G09B 21/00* (2006.01)
*H01F 7/08* (2006.01)

(52) U.S. Cl.
CPC .......... *G09B 21/004* (2013.01); *H01F 7/081* (2013.01)

(58) Field of Classification Search
CPC .......... G09B 21/004; G06F 3/016; G08B 6/00
USPC ............................................. 340/407.1, 407.2
See application file for complete search history.

(56) References Cited

U.S. PATENT DOCUMENTS

| | | | |
|---|---|---|---|
| 2,667,237 A | 1/1954 | Rabinow | |
| 3,972,595 A | 8/1976 | Romankiw et al. | |
| 4,076,387 A | 2/1978 | Haas et al. | |
| 7,204,581 B2 | 4/2007 | Peeters | |
| 8,400,410 B2 | 3/2013 | Taylor et al. | |
| 8,456,438 B2* | 6/2013 | Ciesla | G06F 3/0202 345/156 |
| 8,587,541 B2* | 11/2013 | Ciesla | G06F 3/016 340/407.1 |
| 9,274,612 B2* | 3/2016 | Ciesla | G06F 3/0202 |
| 2014/0104047 A1* | 4/2014 | Bolzmacher | G06F 3/016 340/407.2 |
| 2015/0205368 A1* | 7/2015 | Yairi | G06F 3/046 345/173 |

OTHER PUBLICATIONS

Felton, et al., "A Method for Building Self-Folding Machines", Science, vol. 345, issue 6197, pp. 644-646 (Aug. 8, 2014).

* cited by examiner

*Primary Examiner* — Toan N Pham
(74) *Attorney, Agent, or Firm* — James S. Tak

(57) ABSTRACT

A texture-inducible substrate includes a backplate, a deformable membrane positioned in front of the backplate to form a gap therebetween, and a ferrofluid contained in the gap. The substrate also includes an electromagnet positioned on the backplate to induce, when activated, a local volume of the ferrofluid to expand in volume and increase in viscosity so as to locally deform and raise an adjacent section of the deformable membrane.

3 Claims, 1 Drawing Sheet

TEXTURE-INDUCIBLE SUBSTRATE

CROSS-REFERENCE TO RELATED APPLICATIONS

This application claims the benefit of U.S. provisional application No. 62/111,565 filed Feb. 3, 2015, which is incorporated by reference herein.

FEDERALLY SPONSORED RESEARCH OR DEVELOPMENT

The United States Government has rights in this invention pursuant to Contract No. DE-AC52-07NA27344 between the United States Department of Energy and Lawrence Livermore National Security, LLC for the operation of Lawrence Livermore National Laboratory.

BACKGROUND

The present invention relates to a surface texture altering methods, and more particularly to a method of changing the surface texture of a substrate using an applied magnetic field to control the coefficient of friction of the substrate or change the perceived sensation of the material when touched.

Some examples of tactile displays known in the art are as follows. The article by Liu, Yanju, R. I. Davidson, P. M. Taylor, J. D. Ngu, and J. M. C. Zarraga, entitled "Single Cell Magnetorheological Fluid Based Tactile Display" *Displays* 26, no. 1 (Jan. 2005), describes a tactile display based on magnetorheologic fluids in which the fluid is selectively stiffened with an applied magnetic field. And the article by Matsunaga, T., K. Totsu, M. Esashi, and Y. Haga, entitled "Tactile Display Using Shape Memory Alloy Micro-Coil Actuator and Magnetic Latch Mechanism" *Displays* 34, no. 2 (Apr. 2013), discusses actuating a pin by heating a shape memory alloy. The pin latches into place via a magnet placed to prevent the pin from retracting when electrical heating of the shape memory alloy is stopped.

SUMMARY

In one exemplary embodiment, the present invention includes a texture-inducible substrate, comprising: a backplate; a deformable membrane positioned in front of the backplate to form a gap therebetween; a ferrofluid contained in the gap; and an electromagnet positioned on the backplate to induce, when activated, a local volume of the ferrofluid to expand in volume and increase in viscosity so as to locally deform and raise an adjacent section of the deformable membrane.

In another exemplary embodiment of the texture-inducible substrate, the substrate further comprises at least one additional electromagnet positioned on the backplate, wherein the electromagnets are individually addressable; and a controller for activating select electromagnets to locally deform and raise corresponding adjacent sections of the deformable membrane to form a textured surface pattern.

In another exemplary embodiment, the present invention includes a texture-inducible substrate, comprising: a backplate; an array of actuation units arranged on the backplate, each actuation unit comprising: an electromagnet positioned on the backplate; a deformable membrane positioned in front of the electromagnet to form a gap therebetween; and a ferrofluid contained in the gap, wherein the electromagnet is adapted to induce, when activated, the ferrofluid to expand in volume and increase in viscosity so as to deform and raise the deformable membrane; and a controller for activating select electromagnets to deform and raise corresponding deformable membranes to form a textured surface pattern across the array of actuation units.

Generally, the present invention is directed to a texture-inducible substrate adapted to transiently produce a textured surface pattern by using one or more electromagnets to induce localized expansion of a ferrofluid occupying a gap between the electromagnet(s) and a deformable membrane. The textured surface pattern produced by the present invention may have various applications, such as for example providing a controllable friction surface, a reconfigurable Braille display, or as a tactile display.

The electromagnet(s) is embedded or otherwise positioned on a backplate and connectable to a power supply, and a deformable membrane is positioned in front of the backplate to form a gap therebetween. The backplate, including any electromagnets thereon, can be rigid, such as metal, wood, or hard plastic, or it may be flexible or deformable, such as paper, or thin plastic, which in turn would make the texture-inducible substrate also rigid or flexible. In some embodiments, an array of individually addressable electromagnets may be provided on the backplate, with a controller to selectively activate electromagnets to induce select regions of the deformable membrane to deform in a raised manner.

In some embodiments, the ferrofluid or magnetorheological fluid is sealably contained in and occupies a gap formed between a backplate and a deformable membrane positioned in front of the backplate. In other embodiments, the ferrofluid is contained in and occupies a gap formed between an electromagnet and a deformable membrane positioned in front of the electromagnet. In either case, the ferrofluid is a fluid that becomes strongly magnetized in the presence of a magnetic field, and expands in volume and/or changes viscosity. By confining the ferrofluid in the gap, the shape change can result in a change in the texture of the deformable membrane surface. Ferrofluids or magnetorheologic fluids may, for example, be a colloidal liquid comprising nanoscale or micron sized ferromagnetic or ferrimagnetic particles suspended in a carrier fluid, such as for example and organic dispersant liquid or water, and optionally, a stabilizer to prevent agglomeration of the particles. Commonly, carbonyl iron in mineral oil is used, but several particle/dispersant systems are useful, such as nickel particles in silicon oil or iron oxide-silica core-shell particles in water.

In operation, the electromagnet(s) induce, when activated, a local volume of the ferrofluid to expand in volume and increase in viscosity due to the magnetic field so as to locally deform and raise an adjacent section of a deformable membrane. This deformation changes the surface texture of the device and produces a textured surface pattern. When the electromagnet is de-energized or removed, the ferrofluid returns to its original state and the surface texture disappears.

The texture surface pattern produced by the texture-inducible substrate of the present invention may be, for example, a reconfigurable Braille letter display, images, textured surfaces with increased or otherwise controlled coefficient of friction. The texturing can also increase or otherwise modulate the coefficient of friction. For example, the texture-inducible substrate may be used on a case for a cell phone. When the substrate is activated the coefficient of friction will increase allowing the phone to be placed on an incline without moving. When the substrate is deactivated, the coefficient of friction will decrease causing the phone to slide down the incline. Furthermore, for microscale and nanoscale electromagnets, several of the electromagnets can be energized to create a nanoscale textured surface. At these scales, the surface texturing can increase or decrease the wettability of the surface depending on the wetting characteristics of the deformable membrane. For instance, if the membrane is weakly hydrophobic, a water drop placed on the membrane may stick (its contact angle is <150 degrees). When the electromagnets are activated, the deformable membrane will roughen transitioning the surface to a superhydrophobic state where the contact angle is ~180 degrees, causing the drop to roll off.

BRIEF DESCRIPTION OF THE DRAWINGS

The accompanying drawings, which are incorporated into and forma a part of the disclosure, are as follows.

DETAILED DESCRIPTION

Figure 1:
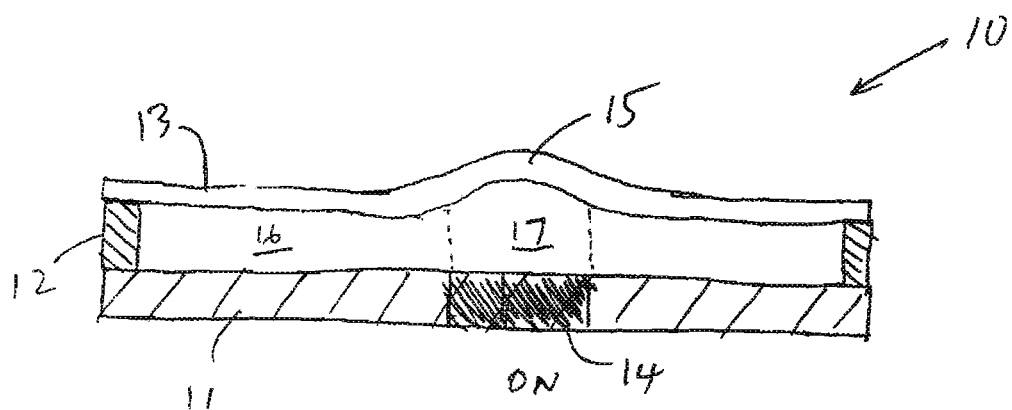
FIG. 1 is a cross-section side view of a first example embodiment of the texture inducible substrate of the present invention having a single electromagnet, and shown with a single raised section of the deformable membrane.

Turning now to the drawings, FIG. 1 shows a first example embodiment of the texture-inducible substrate of the present invention, generally indicated at reference character 10. The texture-inducible substrate is shown having a backplate 11 which may be rigid or flexible, a deformable membrane 13 positioned in front of the backplate to form a gap therebetween, a ferrofluid 16 contained in and occupying the gap, and an electromagnet 14 positioned on the backplate to induce, when activated, a local volume 17 of the ferrofluid to expand in volume and increase in viscosity so as to locally deform and raise an adjacent section 15 of the deformable membrane. It is appreciated that the electromagnet may be any scale, including for example, micro or nanoscale electromagnets.

When the electromagnet is energized/activated, it will locally cause the ferrofluid to expand in volume and increase in viscosity, i.e. a local volume of the ferrofluid will expand and increase in viscosity. The expansion of the ferrofluid pushes on an adjacent section of the deformable membrane to raise the section above unactivated sections of the deformable membrane. The raised section can be felt by rubbing a finger over the surface. De-energizing the electromagnet causes the local ferrofluid and membrane section to return to the original state.

Figure 2:
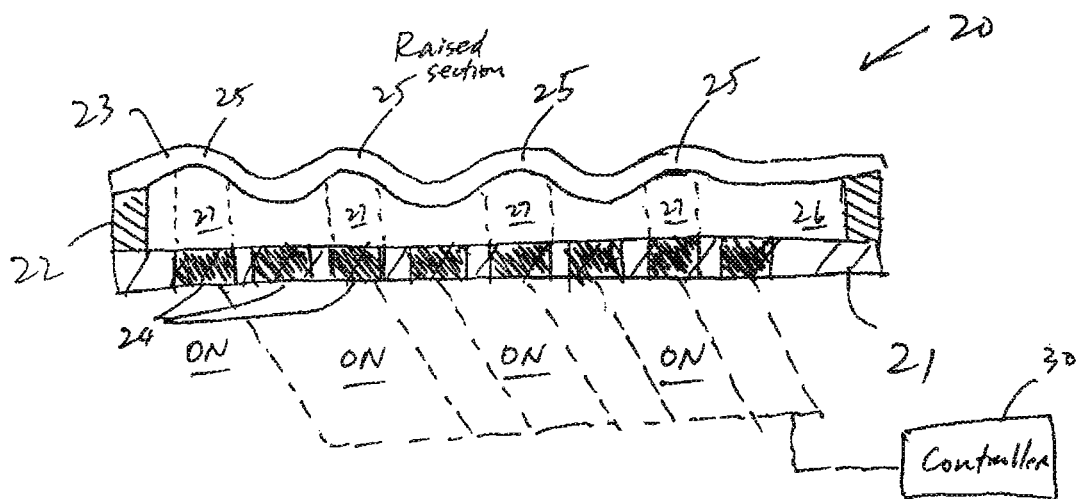
FIG. 2 is a cross-section side view of a second example embodiment of the texture inducible substrate of the present invention having a plurality of electromagnets, and shown with raised sections of the deformable membrane when select electromagnets are activated.

In a second example embodiment shown in FIG. 2, the texture-inducible substrate 20 includes a backplate 21 Which may be rigid or flexible, a deformable membrane 23 positioned in front of the backplate to form a gap therebetween, a ferrofluid 26 contained in and occupying the gap, multiple (i.e. two or more) and individually addressable electromagnets 24 positioned on the backplate which may be rigid or flexible, to induce, when activated, a local volume 27 of the ferrofluid to expand in volume and increase in viscosity so as to locally deform and raise an adjacent section 25 of the deformable membrane, and a controller 30 for activating select electromagnets to locally deform and raise corresponding adjacent sections of the deformable membrane to form a textured surface pattern. in this manner, several of the electromagnets can be energized simultaneously to produce a textured surface pattern. Here too, it is appreciated that the electromagnet may be any scale, including for example, micro or nanoscale electromagnets.

Figure 3:
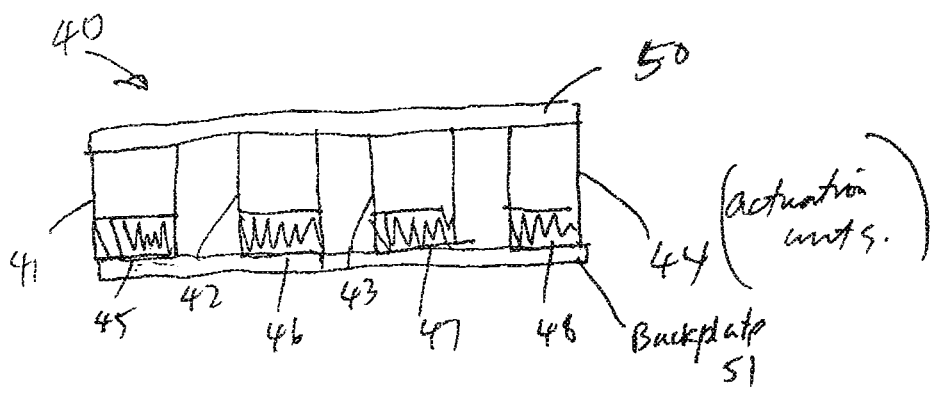
FIG. 3 is a cross-section side view of a third example embodiment of the texture inducible substrate of the present invention having a plurality of actuation units, each with an electromagnet.

In a third example embodiment, shown in FIG. 3 the texture-inducible substrate 50 includes: a backplate 51, an array of actuation units 41-44 arranged on the backplate, each actuation unit comprising: an electromagnet 45-48 positioned on the backplate; a deformable membrane 50 positioned in front of the electromagnet to form a gap therebetween; and a ferrofluid contained in the gap, wherein the electromagnet is adapted to induce, when activated, the ferrofluid to expand in volume and increase in viscosity so as to deform and raise the deformable membrane, and a controller for activating select electromagnets to deform and raise corresponding deformable membranes to form a textured surface pattern across the array of actuation units. In this embodiment, each actuation unit operates independently to produce a raised section over all the deformable membranes of the array.

Although the description above contains many details and specifics, these should not be construed as limiting the scope of the invention but as merely providing illustrations of some of the presently preferred embodiments of this invention. Other implementations, enhancements and variations can be made based on what is described and illustrated in this patent document. The features of the embodiments described herein may be combined in all possible combinations of methods, apparatus, modules, systems, and computer program products. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described above should not be understood as requiring such separation in all embodiments.

Therefore, it will be appreciated that the scope of the present invention fully encompasses other embodiments which may become obvious to those skilled in the art. In the claims, reference to an element in the singular is not intended to mean "one and only one" unless explicitly so stated, but rather "one or more." All structural and functional equivalents to the elements of the above-described preferred embodiment that are known to those of ordinary skill in the art are expressly incorporated herein by reference and are intended to be encompassed by the present claims. Moreover, it is not necessary for a device to address each and every problem sought to be solved by the present invention, for it to be encompassed by the present claims. Furthermore, no element or component in the present disclosure is intended to be dedicated to the public regardless of whether the element or component is explicitly recited in the claims. No claim element herein is to be construed under the provisions of 35 U.S.C. 112, sixth paragraph, unless the element is expressly recited using the phrase "means for."

I claim:

1. A texture-inducible substrate, comprising:
a backplate;
a deformable membrane positioned in front of the backplate to form a gap therebetween;
a ferrofluid contained in the gap and having a ferrofluid volume; and
an electromagnet positioned on the backplate to induce, when activated, a local volume of the ferrofluid volume to expand in volume and increase in viscosity so as to locally deform and raise an adjacent section of the deformable membrane.

2. The texture-inducible substrate of claim 1, further comprising:
at least one additional electromagnet positioned on the backplate, wherein the electromagnets are individually addressable; and
a controller for activating select electromagnets to expand corresponding local volumes of the ferrofluid volume and thereby locally deform and raise corresponding adjacent sections of the deformable membrane to form a textured surface pattern.

3. A texture-inducible substrate, comprising:
a backplate;
an array of actuation units arranged on the backplate, each actuation unit comprising:
an electromagnet positioned on the backplate; a deformable membrane positioned in front of the electromagnet to form a gap therebetween; and a ferrofluid contained in the gap, wherein the electromagnet is adapted to induce, when activated, the ferrofluid to expand in volume and increase in viscosity so as to deform and raise the deformable membrane; and
a controller for activating select electromagnets to deform and raise corresponding deformable membranes to form a textured surface pattern across the array of actuation units.

* * * * *